United States Patent [19]

van Buren, Jr.

[11] 4,245,438

[45] Jan. 20, 1981

[54] FINISHING DISK HUB ASSEMBLY

[75] Inventor: Harold S. van Buren, Jr., Lincoln, Mass.

[73] Assignee: TRW Inc., Cleveland, Ohio

[21] Appl. No.: 73,824

[22] Filed: Sep. 10, 1979

[51] Int. Cl.[3] .......................................... B24D 17/00
[52] U.S. Cl. ...................................... 51/377; 51/378; 51/389; 15/49 R; 403/259
[58] Field of Search ................. 15/49 R; 51/358, 376, 51/377, 378, 379, 382, 383, 384, 388, 389, 390; 403/259, 348, 349

[56] References Cited

U.S. PATENT DOCUMENTS

| | | | |
|---|---|---|---|
| 1,308,093 | 7/1919 | Merritt | 51/376 |
| 3,136,100 | 6/1964 | Robertson | 51/378 X |
| 3,157,010 | 11/1964 | Block | 51/377 |
| 3,315,420 | 4/1967 | Moberg | 51/378 |
| 3,436,875 | 4/1969 | Cheney | 51/376 |
| 3,600,735 | 8/1971 | Jerabek | 15/49 R |
| 3,667,169 | 6/1972 | MacKay | 51/379 |
| 3,667,170 | 6/1972 | MacKay | 51/389 |
| 3,860,209 | 1/1975 | Strecker | 403/348 X |
| 3,912,411 | 10/1975 | Moffat | 403/259 |

Primary Examiner—Gary L. Smith
Assistant Examiner—Robert P. Olszewski
Attorney, Agent, or Firm—James R. O'Connor; Martin J. O'Donnell; Thomas C. O'Konski

[57] ABSTRACT

A finishing disk hub assembly includes a hub section composed of an internally threaded adapter surrounded by a support pad which section is arranged to be screwed onto a rotary threaded shaft. An annular socket is formed in the end of the adapter, a wall of the socket being provided with a set of spaced-apart radial threads. The assembly also includes a locking plate having a set of legs arranged to project through the central opening of a finishing disk into the socket by way of the gaps between the threads. Abutments are provided on the legs which interlock with the adapter threads when the legs are inserted into the adapter socket and the plate is turned through an angle relative to the adapter thereby drawing the plate toward the adapter and clamping the disk between the adapter and the plate.

15 Claims, 5 Drawing Figures

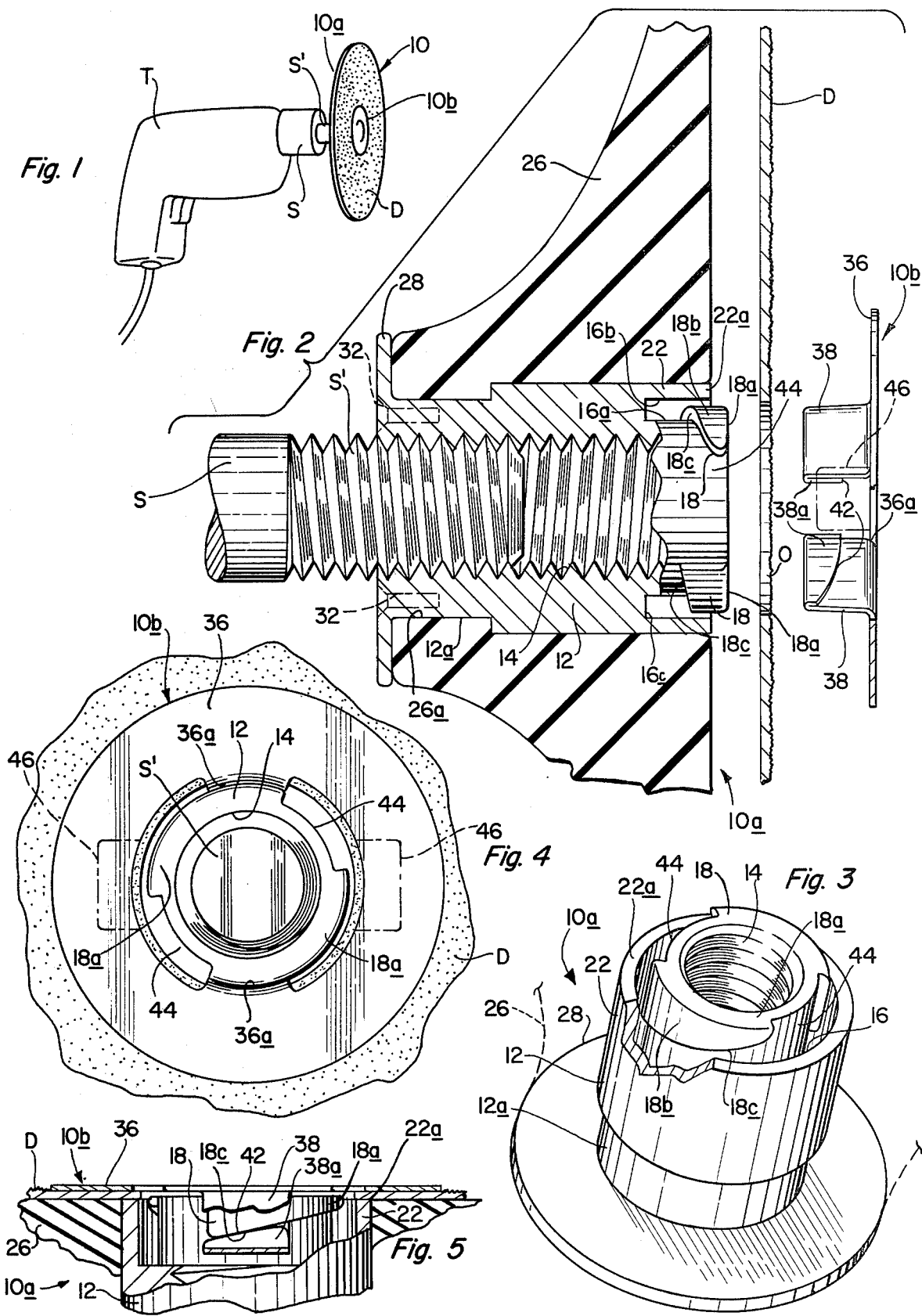

FINISHING DISK HUB ASSEMBLY

BACKGROUND OF THE INVENTION

This invention relates to the field of finishing tools. It relates more particularly to an improved hub for a finishing disk.

A finishing member such as a finishing disk is normally removably attached by way of a hub assembly including a disk support pad to a power tool. When the hub is rotated, the disk rotates with it, permitting the moving disk surface to effectively finish the surface of work pieces such as furniture and automobile body parts. A variety of hub structures have been used heretofore to secure the finishing disk to the power tool. Perhaps the most common of these includes a support pad having a reinforced central aperture arranged to be engaged over the threaded end of the rotary shaft of the power tool. The finishing disk is placed on the flat surface of the pad and a flanged nut is turned down onto the shaft end protruding through the disk. When the nut is tightened, it lays flush against the abrasive surface of the disk and clamps the disk to the support pad.

That mode of attaching the finishing disk to the tool is disadvantaged in that engagement of the rotating finishing disk against a work piece imparts torque to the hub which tends to tighten the nut onto the threaded shaft of the power tool, making it quite difficult to remove the nut in order to replace the disk after it becomes worn. In many heavy industrial applications, the disks have to be replaced quite often, e.g. over five times per hour. Consequently, considering the number of tools in use on a given shift, there is an excessive amount of downtime necessitated by such disk replacement.

In order to avoid that problem, there has been developed a so-called quick release or snap-on finishing disk hub, two versions of which are described in U.S. Pat. Nos. 3,667,169 and 3,667,170. In those arrangements, an adapter is screwed onto the threaded end of the power tool shaft. The adapter may either be incorporated into a special disk support pad or may be in the form of a nut which is turned down onto the power tool shaft after placement on the shaft of a standard support pad. The remainder of the hub assembly consists of a flat annular plate having a centrally located, raised hollow boss.

In one version, the plate is adhered to the back of the finishing disk. In another version, the plate engages the front of the disk and has prongs which project through the disk and are bent against the rear face of the disk to secure the disk to the plate. In both types of plates, the raised boss has a central aperture whose rim is turned inward and shaped to form a screw thread. The boss projecting from the rear face of the article functions as a female component in receiving the threaded end of a stud on the adapter or the end of the power tool shaft itself. The plate and disk are rotated so that the stud or shaft is threaded into the boss until the boss bottoms in a socket formed in the adapter. As such, the boss functions as a male component bearing against the end of the socket. Simultaneously, the annular plate is supposed to engage the end of the adapter forming a two-point contact between the plate and the adapter to create an effective connection between the plate and the adapter.

In practice, however, that simultaneous contact is difficult to achieve unless relatively close tolerances are maintained for the hub parts which makes the hub relatively expensive to manufacture. Also, those prior hub assemblies, including the various spacers and washers required to adapt them to the difficult length threaded power tool shafts, comprise several separate parts which are easily lost. In addition, in the latter two prior hubs, the attachments of the plates to the power tool adapters have not been as strong as they might be.

SUMMARY OF THE INVENTION

Accordingly, it is an object of the present invention to provide an improved quick-release hub assembly for a finishing disk.

Another object of the invention is to provide such an assembly composed of only two separate parts.

A further object of the invention is to provide a finishing disk hub assembly which is easily installed on most standard power tools.

A further object of the invention is to provide an assembly such as this which is relatively inexpensive to make.

Yet another object of the invention is provide such an assembly which firmly clamps the disk to the power tool, yet quickly releases the disk when disk replacement becomes necessary.

Other objects will, in part, be obvious and will, in part, appear hereinafter.

The invention accordingly comprises the features of construction, combination of elements, and arrangement of parts which will be exemplified in the following detailed description, and the scope of the invention will be indicated in the claims.

Briefly, the present hub assembly comprises an adapter which is arranged to be screwed onto the rotary shaft of a standard power tool and an annular plate for removably clamping a standard finishing disk to the adapter.

The adapter is generally cylindrical and is formed with an axially extending threaded passage for receiving the threaded end of the power tool shaft. An annular socket is formed in the end of the adapter. Also, a set of spaced-apart radial thread segments are provided on a side wall of the socket leaving arcuate gaps or slots between the ends of the threads. The side wall of each thread spaced opposite the bottom wall of the socket is given a selected pitch so that it ramps axially toward the bottom wall of the socket. That is, the foot of each thread is located adjacent the mouth of the socket, while the head of each thread is located relatively close to the socket bottom wall, but still spaced therefrom.

Surrounding the adapter is a resilient discoid support pad made of rubber or a similar material. The support pad may be molded directly onto the adapter or attached thereto as will be described in more detail later. In any event, the usual flat face of the pad is more or less flush with the mouth of the socket and it is more or less coextensive with the finishing disk to be mounted to the hub assembly.

The other component of the hub assembly is a clamping plate which is arranged to engage through the central opening formed in the usual finishing disk and interlock with the hub adapter described above. The clamping plate is preferably a simple stamped metal part comprising a flat circular member having a set of perpendicularly projecting legs spaced around the plate center. Near the end of each leg, abutments, preferably ramps, are formed which extend out generally perpendicularly from the legs.

The dimensions and positioning of the plate legs are such that the legs can be slid endwise into the slots between the threads in the adapter. The pitch of the adapter threads is such that when the plate is turned through an angle relative to the adapter, the leg abutments engage under the adapter threads. Continued rotation of the plate causes the leg abutments to slide or ride up on the inclined surfaces of those threads. This draws the plate (and the disk) toward the annular end of the adapter.

Before the abutments on the clamping plate legs reach the heads of the adapter threads and after about a one-quarter turn of the plate, the annular end of the adapter engages the back of the finishing disk so that the disk is clamped between the adapter and the clamping plate. Portions of the sanding disk radially outboard of the plate are, of course, supported by the resilient support pad secured to the adapter. Thus the proper attachment of the finishing disk to the hub assembly does not require the simultaneous engagement of different pairs of hub surfaces. Therefore close tolerances do not have to be maintained for the various hub assembly parts. Resultantly, the assembly is relatively economical to manufacture.

Also, when the clamping plate is clamped to the adapter, the forces imparted to its legs are directed more or less along the lengths of those legs. Therefore, those forces do not tend to bend the legs or otherwise distort the clamping plate. Consequently, the plate provides a very effective securement even though it may be a simple inexpensive stamped metal part which is formed with a minimum amount of material.

On the other hand, the pitches of the adapter threads (and leg abutments) are steep enough so that the plate (or disk) can be rotated easily one-quarter turn in the opposite direction relative to the adapter to release the plate from the adapter when it is necessary to change disks. With all of these advantages, then, the present finishing disk hub assembly should find wide acceptance, particularly in industrial plants where machine downtime should be kept to a minimum.

BRIEF DESCRIPTION OF THE DRAWING

For a fuller understanding of the nature and objects of the invention, reference should be had to the following detailed description, taken in connection with the accompanying drawing, in which:

FIG. 1 is perspective view of a finishing disk tool fitted with a hub assembly made in accordance with this invention;

FIG. 2 is an exploded sectional view on a larger scale with parts in elevation showing the components of the FIG. 1 hub assembly in greater detail;

FIG. 3 is a perspective view with parts broken away of part of the assembly;

FIG. 4 is a fragmentary end view of the assembly, and

FIG. 5 is a fragmentary sectional view showing parts of the assembly in still greater detail.

DESCRIPTION OF THE PREFERRED EMBODIMENT

Referring to FIG. 1 of the drawing, a hub assembly made in accordance with this invention and indicated generally at 10 is used to attach a standard finishing disk D to the threaded end S' of the rotary shaft S of a standard power tool T.

Turning now to FIGS. 2 and 3, the hub assembly comprises a hub section shown generally at 10a and a locking plate indicated generally at 10b. The hub section 10a is screwed onto the threaded shaft end S' and the finishing disk D is arranged to be captured between that hub section and the locking plate 10b when those two components are locked together.

The hub section 10a includes a generally cylindrical adapter 12 having a threaded axial passage 14 for threadedly receiving the shaft end S'. A generally cylindrical annular socket 16 is formed in the end of adapter 12. Also formed on the radially inner socket wall 16a near the outer end thereof is a set of threads 18 spaced apart on diametrically opposite sides of that wall. The walls 18a of those threads are flush with the end of the adapter and the radially outer thread walls 18b are concentric with the adapter. However the remaining side wall 18c of each thread, while being oriented more or less perpendicular to the axis of the adapter, has a defined pitch so that proceeding clockwise around the thread, that surface ramps toward the opposite end of the adapter.

The outer wall 16b of the socket 16 forms with the outside wall of the adapter a skirt 22 which extends axially past the thread surfaces 18c and is closely spaced from the curved thread walls 18b, terminating in a circular edge 22a located just short of the thread side walls 18a.

Referring to FIG. 2, surrounding adapter 12 is a resilient, circular support pad 26 made of rubber or other comparable elastic material. The outer rim of the support pad 26 which is more or less coplanar with the skirt edge 22a has a diameter which is slightly less than that of the finishing disk D. Proceeding axially along the adapter 12 from that plane, the pad tapers down to a much smaller diameter which is more or less the same as that of an annular plate 28 secured to the inner end of adapter 12. The end segment of adapter 12 adjacent plate 28 is provided with a reduced diameter neck 12a which interfits with a reduced diameter neck 26a of pad 26. The plate 28 can be formed integrally with adapter 12 in which case the pad 26 is molded directly onto the adapter. Alternatively, the plate 28 can be formed separately from the adapter and secured thereto by suitable screws shown in dotted lines at 32 in FIG. 2 extending through countersunk holes in plate 28 and threaded into the end of adapter 12. In that event, an axial passage is formed in the pad and the pad is slid onto the adapter from the inner end thereof after which the plate 28 can be secured in place by the screws 32 thereby locking the pad to the adapter.

Turning now to FIGS. 2 and 4, the locking plate 10b is a simple, inexpensive, unitary stamped metal part. It includes a flat annular section 36. A set of two legs 38 project out perpendicular to section 36 from diametrically opposite locations at the inner edge 36a of that section. An end segment 38a of each leg is bent inward back on itself as best seen in FIG. 2 so that the end edge forms an abutment. Preferably also that end edge is cut on a bias, thereby forming a thread or ramp 42 right adjacent the inside face of each leg 38. Each leg 38 including its end segment 38a is formed with an arcuate cross-section so that it is quite rigid.

The legs 38 are slightly narrower than the gaps or slots 44 between the two threads 18 on hub section 10a. Therefore, when attaching the locking plate to the hub section, the legs 38 can be inserted by way of those gaps into the socket 16. The pitch of the leg ramps 42 corresponds more or less to that of the thread surfaces 18c. Consequently, when the plate legs are positioned in the socket and the plate is turned clockwise as viewed in FIG. 4, the leg ramps 42 engage under the threads 18. Further rotation of the plate through approximately one-quarter turn causes those ramps to ride up on the thread surfaces 18c thereby drawing the plate 36 toward the end of the hub section 10a. Preferably the width of the gaps between the thread surfaces 18b and the socket outer wall 16b is less than the thickness of leg segments 38a so that there is no likelihood of the legs being pulled out of the socket 16.

In the absence of a sanding disk D between the hub section 10a and the locking plate, the ramps 42 will slide off the inner ends of the threads 18, there being sufficient clearance between the bottom wall 16c of the socket 16 and the thread surfaces 18c to permit this. Usually, however, prior to attaching the locking plate to the hub section 10a, a sanding disk D is positioned on the locking plate with the plate legs 38 being snugly received in the usual central disk opening O. In that event, when the leg ramps 42 are engaged under the threads 18, a one-quarter clockwise turn of the disk using the palm of the hand will automatically turn the plate 36. The skirt edge 22a will engage the rear face of the finishing disk when the leg ramps 42 are approximately two-thirds of the way along the threads 18, thereby clamping the sanding disk between the skirt edge 22a and the annular plate 36 as best shown in FIG. 5.

The provision of appreciable gaps or spaces between the thread surfaces 18c and the bottom wall 16c of socket 16 thus accomplishes two things. Firstly, it ensures that when the section 10a and plate 10b are locked together as shown in FIG. 5, the plate legs 38 do not bottom in the socket so that the legs become wedged between the threads 18 and the socket bottom wall. That might create pairs of simultaneously engaging surfaces that could make the plate difficult to release. Secondly, if the plate legs are inserted into the socket 16 without a disk D, the plate and adapter sleeve will not interlock at all. If that were to occur, the plate is so small and thin that it might be difficult to release the plate in the usual way by engaging and turning it with the palm or fingers.

When the tool T is energized, the hub assembly is rotated counterclockwise so that when the finishing disk D is placed against a workpiece, the forces on the disk tend to rotate the disk and the locking plate 36 in the opposite direction, i.e., clockwise. Therefore, the locking plate is always biased toward the hub section 10a so that it firmly clamps the finishing disk D. When in place, the plate 36 face is supported by the skirt 22 and pad 26. On the other hand, the forces exerted on its legs 38 by threads 18 are substantially all tensile forces. Therefore, even if a substantial torque is imparted to the plate via the disk and pad, the plate is not deformed nor its legs bent so as to weaken the connection to hub section 10a.

It should be understood, however, that the pitches of the leg ramps 42 and the thread surfaces 18c are steep enough so that the leg ramps disengage easily from the threads when the finishing disk D is turned counterclockwise using the palm of the hand until the locking plate legs 38 engage the ends of the threads 18. This automatically lines them up with the gaps 44 between the threads 18 permitting the locking plate to be retracted from the socket 16 in the event it becomes necessary to change the sanding disk D.

The locking plate 10b can be arranged to removably engage the sanding disk D simply by virtue of the frictional engagement of its legs 38 with the edge of the disk opening O. In this way, a number of disks can be marketed in a package containing, say, one clamping plate 10b. Alternatively, the plate 10b can be formed with small rectangular tabs at its inside edge 36a which project out parallel to legs 38. Then after the plate legs 38a are received in the disk opening O, the tabs 46 can be bent over flush against the rear face of the disk as seen in dotted lines in FIG. 4, thereby permanently securing the disk to the plate. In this event, there can be marketed a package of disks with already installed throw-away clamping plates to minimize disk replacement time.

It will be seen from the foregoing, then, that my improved finishing disk hub assembly securely attaches a standard finishing disk to a standard power tool. The assembly is quite simple, being composed of only two separate components, to wit, a hub section and a locking plate. The locking plate is particularly easy and inexpensive to manufacture, being a simple stamped metal part so that it can even be a throw-away item. Yet it makes a very strong connection between the finishing disk and the hub section. Therefore, the overall assembly should find wide application, particularly in the automotive and furniture industries where a considerable amount of industrial finishing must be performed in a relatively expeditious manner.

It will be further be seen that the objects set forth above, among those made apparent from the preceding description, are efficiently attained. Also certain changes may be made in the above construction without departing from the scope of the invention. For example, the adapter threads 18 can be formed on the socket outer wall 16b in which case, of course, the leg segments 38a would be bent in the opposite direction, placing the ramps 42 on the outboard sides of the legs. Also, additional adapter threads may be added to the thread set in which case the plate legs would be increased correspondingly in number and be positioned accordingly to engage the threads as described above. Therefore, it is intended that all matter contained in the above description or shown in the accompanying drawing be interpreted as illustrative and not in a limiting sense.

It is also to be understood that the following claims are intended to cover all of the generic and specific features of the invention herein described.

What is claimed as new and desired to be secured by Letters Patent of the United States is:

1. A hub assembly for a finishing disk comprising
   A. an adapter,
   B. means defining an axial threaded passage in the adapter,
   C. an annular socket formed in an end of the adapter,
   D. a set of similar radial threads spaced around a side wall of the socket leaving gaps between the ends of the threads, said threads being spaced from the bottom wall of the socket, the sides of the threads spaced opposite said bottom wall having the same axial pitch,
   E. a locking plate, said plate having a flat planar section and a set of legs projecting substantially perpendicularly from that section, said legs being arranged and adapted to slide into the adapter socket through said thread gaps so that the planar section is coaxial with the adapter; and F. laterally extending abutments formed on said legs near the free ends thereof, said abutments being arranged and adapted to engage under the adapter threads when the legs are inserted into the socket so that when the plate is turned through an angle relative to the adapter, the abutments ride up on the threads and draw the plate toward said end of the adapter.

2. A hub assembly defined in claim 1 wherein the adapter threads are formed on the radially inner wall of the socket.

3. The hub assembly defined in claim 1 wherein the thread set comprises a pair of said diametrically opposite threads.

4. The hub assembly as defined in claim 1 and further including a generally circular disk support pad surrounding the adapter and secured coaxially thereto.

5. The hub assembly defined in claim 4 wherein said pad is molded directly onto the adapter.

6. The hub assembly defined in claim 4
A. wherein the support pad is formed with an axial passage for slidably receiving the adapter, and
B. further including means for removably securing the pad to the adapter.

7. The hub assembly defined in claim 6 wherein the securing means comprises
A. a plate, and
B. one or more fasteners for removably connecting the plate to the other end of the adapter.

8. The hub assembly defined in claim 1 wherein the planar section of the locking plate comprises a flat annulus and said plate legs are spaced around the inner edge of the annulus.

9. The hub assembly defined in claim 8 wherein the plate legs are formed from the material removed from the planar section to create the central opening in the annulus.

10. The hub assembly defined in claim 8 wherein the leg set contains two legs disposed at diametrically opposite locations on said annulus inner edge.

11. The hub assembly defined in claim 1 wherein the leg abutments more or less face one another.

12. The hub assembly defined in claim 1 wherein said plate legs have an arcuate cross-section.

13. The hub assembly defined in claim 1 wherein said leg abutments comprise the end edges of segments of said legs bent back on themselves.

14. The hub assembly defined in claim 13 wherein said end edges are cut on a bias so that said abutments comprise ramps having a pitch or slope corresponding more or less to the adapter thread pitch.

15. The hub assembly defined in claim 1 wherein the minimum spacing between the adapter threads and the bottom wall of the socket is greater than the maximum spacing between said leg abutments and the ends of said legs.

* * * * *